United States Patent [19]

Mopper

[11] Patent Number: 4,465,018
[45] Date of Patent: Aug. 14, 1984

[54] PET RELIEF STATION

[76] Inventor: Terry B. Mopper, 322 Grasmere Dr., Staten Island, N.Y. 10305

[21] Appl. No.: 495,774

[22] Filed: May 18, 1983

[51] Int. Cl.$^3$ .............................................. A01K 29/00
[52] U.S. Cl. ...................................................... 119/1
[58] Field of Search ...................................... 119/1, 19

[56] References Cited

U.S. PATENT DOCUMENTS

| | | | |
|---|---|---|---|
| 2,039,783 | 5/1936 | Ebeling | 119/1 |
| 3,111,932 | 11/1963 | Knutson | 119/1 |
| 3,793,988 | 2/1974 | Traeger | 119/1 |
| 3,954,086 | 5/1976 | Maness | 119/1 |
| 4,327,667 | 5/1982 | Bilak | 119/1 |

Primary Examiner—Jay N. Eskovitz
Attorney, Agent, or Firm—McAulay, Fields, Fisher, Goldstein & Nissen

[57] ABSTRACT

A pet relief station is comprised to provide a safe, sanitary and natural method for pets to excrete their waste products indoors. The station has a housing which has an opening therein for the pet to enter and exit from. Inside the housing is a platform to support the pet. A plastic sheet which holds litter is mounted above the platform for horizontal movement across same. A movable take-up roll and a movable feedroll are provided and the plastic sheet is anchored to them. A motor is included which moves the take-up and feed rolls which in turn move the plastic sheet. Above the platform is positioned a litter hopper with a bottom opening and a litter meter. Below the platform is positioned a lineable disposal chamber with a filter screen. The disposal chamber is separated from the rest of the housing to insure the pet's safety.

7 Claims, 4 Drawing Figures

PET RELIEF STATION

BACKGROUND OF THE INVENTION

1. Field of the Invention

The invention relates to a litter box, and more particularly to an automatic litter box which filters solid waste products from the used litter.

2. Description of the Prior Art

Boxes or other containers with absorbent litter therein are commonly used by cats or other household animals for excretion of solid and liquid wastes. The solid wastes must be frequently removed from the litter to prevent uncleanliness and odors. The litter, with the liquid wastes therein is changed periodically for hygienic reasons.

The prior art discloses numerous devices hygienically permit a pet to excrete its waste products indoors. One such prior art device, as shown in U.S. Pat. No. 3,954,086, discloses an excrement collection drawer located under a rotating platform. After a pet excretes, the platform opens and permits the excrement to fall into the excrement collection drawer. Another such prior art device, shown in U.S. Pat. No. 3,937,182, discloses a litterless pet toilet with an endless belt extended around rollers. At one end of the belt is a receptacle into which the waste products fall as the belt rotates. Neither of these devices provides a safe and appealing system for the pet, the former device being potentially harmful when the supporting platform opens, and the latter device failing to provide a digging and covering means for the pet. Further, neither of the aforementioned devices includes a way to automatically remove solid waste from the litter.

SUMMARY OF THE INVENTION

OBJECTS OF THE INVENTION

It is an object of the present invention to provide an improved pet relief station.

It is another object to provide a relief station of the type described which avoids the various disadvantages of prior art relief stations.

Still another object is to provide a pet relief station which is safe for pets to use.

Yet a further object is the provision of a pet relief station which the pet will be attracted to and hence will use.

It is yet a further object to provide a pet relief station which automatically filters and separates solid waste material from the used litter, providing enhanced convenience for the pet owner.

Another object of the invention is to provide an economical relief station which allows litter to be reused.

An additional object is to provide a pet relief station which is sanitary and which prevents the buildup of bacteria and odor.

A further object is to provide a pet relief station which permits a pet owner to leave his pet for up to one month with the secure knowledge that the pet relief site will be automatically maintained.

Other objects of the present invention in part will be obvious and in part will be pointed out hereinafter.

BRIEF DESCRIPTION OF THE INVENTION

In keeping with these objects and others which will become apparent hereinafter, one feature of the present invention resides, briefly stated, in a pet relief station which includes a horizontal litter transport system. The pet enters into the housing and is supported by a platform. A moveable plastic sheet with litter thereon is provided for the pet. A hopper is provided to hold litter for metering across the plastic sheet. When it is desired to change the litter the plastic sheet is moved such that the used litter falls off of one end, through a filter and into a lined collection chamber. Solid waste is removed from the used litter via a filtering screen or other filtering device. The collection chamber is easily removable from the housing for cleaning purposes. Additionally, a partition is provided which prevents the pet from accidentally falling into the collection chamber.

The novel features which are characteristic of the invention are set forth in particular in the appended claims. The invention itself, however, both as to its construction and its method of operation, together with additional objects and advantages thereof, will be best understood from the following description of the specific embodiments when read in connection with the accompanying drawings.

DETAILED DESCRIPTION OF THE PREFERRED EMBODIMENTS

Figure 1:
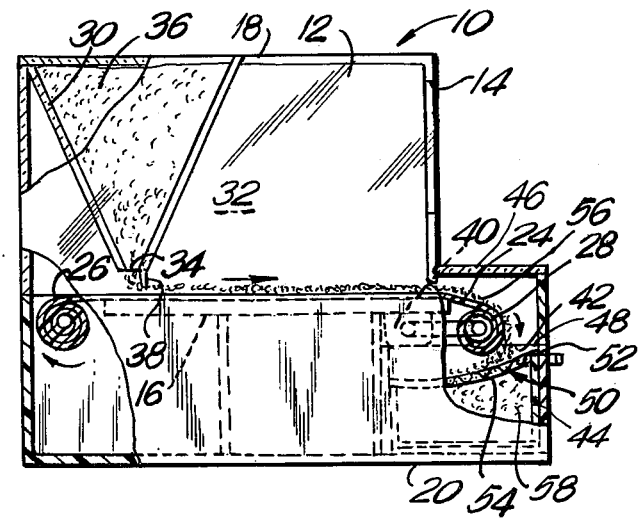
FIG. 1 is a front elevational view of a pet relief station constructed according to the present invention.
Figure 2:
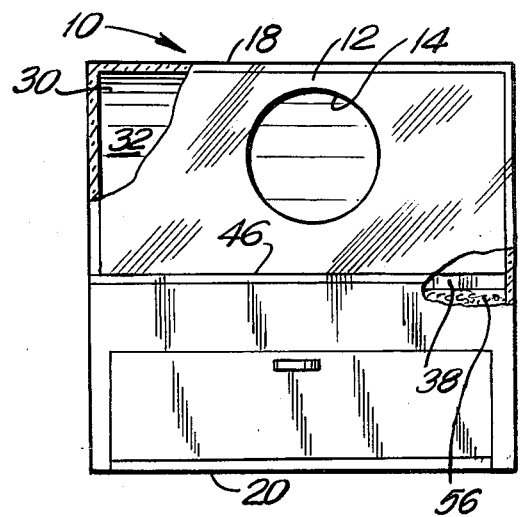
FIG. 2 is a right side view thereof.
Figure 3:
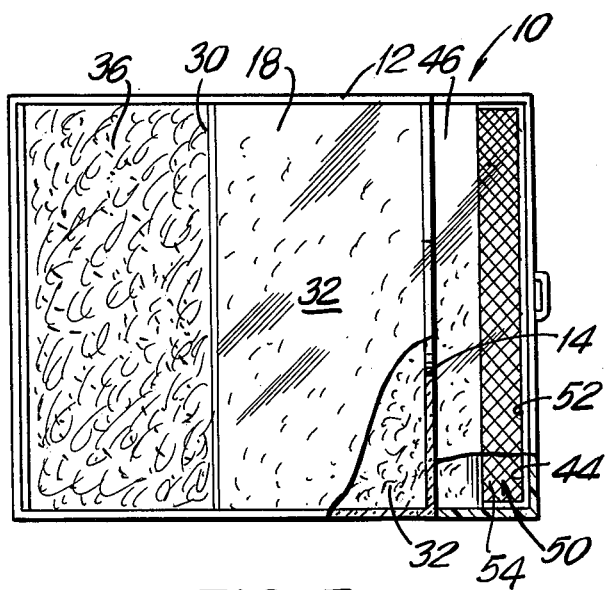
FIG. 3 is a top plan view thereof.

Referring now to the drawings, the reference numeral 10 denotes a pet relief station. The station 10 has a housing 12 with an entrance and/or exit opening 14 formed therein. Opening 14 is shaped and dimensioned such that a pet may easily fit therethrough. Although not shown in the drawings, an easily movable door means may be attached to opening 14 if desired.

A pet supporting member 16 is connected to the inside of the housing. Pet supporting member 16 is positioned between the top 18 of the housing and the bottom 20 of the housing. Opening 14 is located such that when the pet enters therethrough the pet steps onto supporting member 16.

Above supporting member 16 is a movable litter supporting member which in the preferred embodiment is plastic sheet 24. Plastic sheet 24 is capable of horizontal movement above and across supporting member 16. Movable anchoring means which in the preferred embodiment comprises feed roll 26 and take-up roll 28 are provided for supporting plastic sheet 24. In the preferred embodiment feed roll 26 and take-up roll 28 are positioned beneath supporting member 16.

A litter storage chamber or hopper 30 is located above supporting member 16 and to one side thereof, thereby providing an elimination chamber 32. Hopper 30 has an opening 34 in the bottom thereof.

Litter 36 is placed into hopper 30. Adjacent opening 34 is a metering means 38 which measures out litter 36 from hopper 30 and spreads same along plastic sheet 24. In the preferred embodiment of the invention metering means 38 is a knife blade spaced above the sheet by a preselected distance so a predetermined amount of litter is spread across the sheet as the sheet moves past the blade.

Means is provided to move feedroll 26 and take-up roll 28. Any appropriate moving means can be used and those knowledgeable in the art will know which are the most appropriate. In the preferred embodiment the moving means is a conventional motor 40 positioned adjacent to take-up roll 28 and beneath pet supporting member 16. The motor may incorporate appropriate timer means so it is activated periodically and for sufficient duration to move the liner a distance equal to the length of the liner accessible to the pet.

A movable disposal chamber 42 is provided. Disposal chamber 42 is positioned beneath plastic sheet 24 and adjacent to take-up roll 28. Disposal chamber 42 is shaped and dimensioned to receive disposable collection bags, an example of one is shown in the figures and identified by reference numberal 44. To protect the pet, disposal chamber 42 is separated from the rest of the housing 12 by the front external wall of the housing 12.

A hatchcover 46 is provided for disposal chamber 42 which in addition to its covering function serves as a stability and support step.

Secured at the uppermost part 48 of disposal chamber 42 is a filtering means which in the preferred embodiment is a screen 50. Screen 50 is positioned on an acute angle such that its uppermost edge 52 is adjacent and beneath take-up roll 28. The mesh 54 of screen 50 is such that solid waste cannot pass therethrough but used litter can pass therethrough. Hence, litter is separated into two portions: solid waste 56, and filtered used litter 58. Filtered used litter 58 is reusable.

Figure 4:
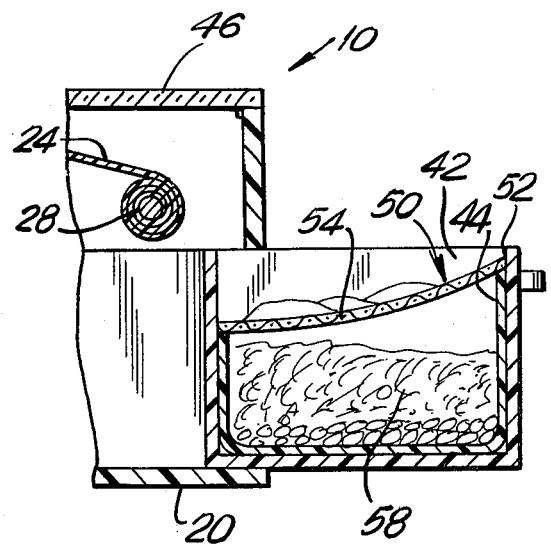
FIG. 4 is a detail view showing the filter arrangement of the present invention.

In practice, the pet relief center 10 of the invention works as follows: Clean litter is placed into hopper 30. A pet enters into housing 12 through opening 14. The pet excretes upon litter which has been spread by metering means 38 along plastic sheet 24. The pet then can exit through opening 14. When it is desired to change the litter, motor 40 is activated either manually or automatically, which thereby causes rotation of feedroll 26 and take-up roll 28 to move the liner in a predetermined horizontal direction. That is, the movement of rolls 26 and 28 in turn moves plastic sheet 24 horizontally across and above pet supporting member 16. As plastic sheet 24 moves over the edge of pet support member 16 and onto take-up roll 28 the litter thereon falls off due to gravitational forces. The litter falls onto screen 50 which separates the solid waste 56 from the filtered used litter 58. As shown in FIG. 4, the filter screen 50 curved downwardly so that the solid waste rolls downwardly, toward the left. On the other hand, filtered used litter 58 falls into and is contained in lined disposal chamber 42 where it can be easily and sanitarily removed from and reused if desired. Likewise, the solid waste 56 can be easily and sanitarily removed from its place above screen 50. Alternatively, a disposable, open-mouthed pouch or container (not shown) may be positioned at the lower end of the filter to catch the waste materials.

It will be understood that each of the elements described above, or two or more together, may also find useful application in other types of constructions from the types described above.

While the invention has been illustrated and described as embodied in a pet elimination center which automatically and sanitarily filters and stores pet waste products, it is not intended to be limited to the details shown, since various modifications, and structural changes may be made without departing in any way from the spirit of the invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed:

1. A pet relief station comprising:
    (a) a housing having a plurality of walls with an opening formed in at least one of said plurality of walls to permit a pet to enter and exit said housing;
    (b) a pet supporting member in said housing terminating short of one of said plurality of walls to define a waste-receiving opening therebetween;
    (c) litter dispensing and spreading means in said housing for dispensing and spreading litter;
    (d) a movable sheet on said pet support member spaced below said dispensing and spreading means to receive litter therefrom; said litter being spread along said movable sheet by said litter dispensing and spreading means, said movable sheet extending into said waste-receiving opening at one end;
    (e) moving means for moving said sheet;
    (f) and a removable disposal chamber positioned below said opening to receive waste materials and litter from said sheet as said sheet is removed.

2. A pet relief station as in claim 1, in which said disposal chamber includes a filter thereto for separating solid waste material from said litter.

3. A pet relief station as in claim 2, in which said filter curves downwardly to cause the solid waste materials to accumulate at the lower portion of said filter, and a container at said lower portion to receive the solid waste material.

4. A pet relief station as in claim 1, and a removable liner in said disposal chamber.

5. A pet relief station as in claim 1, in which said litter dispensing and spreading means comprises a hopper, and a metering blade spaced above said sheet by a preselected distance to meter the amount of litter dispensed by said hopper.

6. A pet relief station as in claim 1, in which said moving means comprises a feed roll mounted on said housing for supporting a roll of said sheet, and a take-up roll positioned in said opening and connected to said sheet, and a selectively energizable motor connected to said take-up roll for rotating said take-up roll in selected steps.

7. A pet relief station as in claim 1, in which said disposal chamber comprises a drawer slidably received in said housing.

* * * * *